US010357994B2

(12) United States Patent
Nishi et al.

(10) Patent No.: US 10,357,994 B2
(45) Date of Patent: Jul. 23, 2019

(54) WHEEL AND ITS REINFORCED MEMBER

(71) Applicant: HONDA MOTOR CO., LTD., Tokyo (JP)

(72) Inventors: Masaaki Nishi, Wako (JP); Yusuke Osawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 15/641,872

(22) Filed: Jul. 5, 2017

(65) Prior Publication Data

US 2018/0009258 A1 Jan. 11, 2018

(30) Foreign Application Priority Data

Jul. 6, 2016 (JP) .................. 2016-134238

(51) Int. Cl.
| | |
|---|---|
| *B60B 21/12* | (2006.01) |
| *B60B 21/02* | (2006.01) |
| *B60B 7/06* | (2006.01) |
| *B60B 7/01* | (2006.01) |
| *B60B 7/02* | (2006.01) |
| *B60B 3/00* | (2006.01) |
| *B60B 3/16* | (2006.01) |

(52) U.S. Cl.
CPC .............. *B60B 21/12* (2013.01); *B60B 7/01* (2013.01); *B60B 7/02* (2013.01); *B60B 7/063* (2013.01); *B60B 21/023* (2013.01); *B60B 3/001* (2013.01); *B60B 3/16* (2013.01); *B60B 2310/318* (2013.01); *B60B 2360/341* (2013.01); *B60B 2900/111* (2013.01); *B60B 2900/311* (2013.01); *B60B 2900/3314* (2013.01)

(58) Field of Classification Search
CPC ........... B60B 7/01; B60B 7/063; B60B 21/12; B60B 21/023; B60B 7/02; B60B 3/02
USPC ............................ 301/37.24, 95.107
See application file for complete search history.

(56) References Cited

U.S. PATENT DOCUMENTS

| | | | | |
|---|---|---|---|---|
| 3,758,161 A | * | 9/1973 | Bradley | .................. B60B 21/02 |
| | | | | 152/378 R |
| 7,393,062 B1 | * | 7/2008 | Heck | ......................... B60B 7/01 |
| | | | | 301/37.11 |

(Continued)

FOREIGN PATENT DOCUMENTS

| | | | | |
|---|---|---|---|---|
| DE | 19533612 A1 | * | 3/1997 | ............... B60B 3/02 |
| DE | 102013003699 A1 | * | 9/2014 | ............... B60B 7/06 |

(Continued)

OTHER PUBLICATIONS

Notification of Reasons for Refusal dated Apr. 3, 2018, issued in counterpart Japanese Application No. 2016-134238, with English machine translation. (6 pages).

*Primary Examiner* — Kip T Kotter
(74) *Attorney, Agent, or Firm* — Westerman, Hattori, Daniels & Adrian, LLP

(57) ABSTRACT

A rim section 18 is provided with e disk section 20 and is secured to a jig by patting the disk section 20 as the lower side. By allowing a groove section 40 (an engaging section) provided along a circumferential direction of the inner peripheral surface 21 of the rim section 18 to engage with a bent end section 48 of a reinforced member 14 attached from the upper side of the jig, the reinforced member 14 can be easily positioned on the inner peripheral surface 21 of the rim section 18.

6 Claims, 5 Drawing Sheets

(56) References Cited

U.S. PATENT DOCUMENTS

| | | | |
|---|---|---|---|
| 9,586,438 B2 * | 3/2017 | Wurft | B60B 7/063 |
| 2002/0153763 A1 * | 10/2002 | Van Houten | B60B 7/0013 |
| | | | 301/37.43 |
| 2007/0120415 A1 * | 5/2007 | Kang | B60B 7/01 |
| | | | 301/37.24 |
| 2015/0008723 A1 * | 1/2015 | Wurft | B60B 7/01 |
| | | | 301/37.24 |
| 2015/0008724 A1 * | 1/2015 | Wurft | B60B 7/063 |
| | | | 301/37.24 |
| 2016/0001593 A1 * | 1/2016 | Gielisch | B60B 7/02 |
| | | | 301/37.11 |

FOREIGN PATENT DOCUMENTS

| | | |
|---|---|---|
| JP | 2003-260904 A | 9/2003 |
| JP | 2011-79358 A | 4/2011 |

* cited by examiner

WHEEL AND ITS REINFORCED MEMBER

CROSS-REFERENCE OF RELATED APPLICATION

This application claims priority of Japanese Patent Application No. 2016-134238 filed in Japan on Jul. 6, 2016, the entire contents of which are incorporated herein by reference.

TECHNICAL FIELD

The present invention relates to a light alloy wheel for a vehicle and its reinforced member, and more specifically, to a light alloy wheel for a vehicle and its reinforced member suitable for application to a three-wheel or four-wheel vehicle in which right and left wheels (a wheel: a tire with a wheel) are attached to both ends of a wheel axis.

BACKGROUND OF THE INVENTION

For example, referring to FIG. 1 and FIG. 8 (e) of Japanese Published unexamined Application No. 2011-79358, a light alloy wheel is disclosed in which a reinforced section composed of a reinforced fiber member (55) is formed on the inner peripheral surface of a rim flange section (9) of a inner rim section (2) ([0022] of Japanese Published Unexamined Application No. 2011-79358).

SUMMARY OF THE INVENTION

However, in the wheel according to the prior art, since a reinforced section is formed in an arched arc shape, in the case where a reinforced fiber member is secured to the inner peripheral surface of a rim flange section by an adhesive, positioning of the reinforced section is difficult. As a result, it is difficult to make the adhesive thickness uniform and to hold the uniform rigidity when rotated.

The present invention was made in consideration of the problems stated above. An object of the present invention is to provide a wheel and its reinforced member in which the reinforced member can be easily positioned on the inner peripheral surface of the rim section when the reinforced member is attached to the inner peripheral, surface of the rim section.

A wheel according to the present invention is a light alloy wheel for a vehicle which is provided with a rim section (or simply referred to as a rim) which mounts a tire on the outer peripheral surface, wherein a circular reinforced member composed of a reinforced fiber member which is adhered along a circumferential direction to a section of the inner peripheral surface of the rim section is provided, and a positioning member for the reinforced member is provided on the inner peripheral surface of the rim section.

According to the present invention, since the circular reinforced member composed of the reinforced fiber member adhered by an adhesive along a circumferential direction to a section of the inner peripheral surface of the rim section on which the tire is mounted is provided, it is possible to increase the rigidity of the light alloy wheel. Also, when the reinforced member is attached to the inner peripheral surface of the rim section, it is possible to easily position the reinforced member on the inner peripheral surface of the rim section by means of a positioning section.

In this case, the wheel is provided with a disk section on one end section side of the rim section in the axial direction and as the positioning section, an engaging section is provided along the inner peripheral surface of the other end section side of rim section in the axial direction. The circular reinforced member may be positioned by allowing its one section to engage with the engaging section and be adhered and attached by an adhesive to the inner peripheral surface of the other end section side of the rim section in the axial direction.

In this manner, since the circular reinforced member composed of the reinforced fiber member which is positioned by allowing its one section to engage with the engaging section provided along a circumferential direction of the inner peripheral surface of the other end section side of the disk section side of the rim section in the axial direction on which the tire is mounted is adhered, and attached by the adhesive along the inner peripheral surface of the other end section side (the side where the wheel rigidity is weak) of the disk section side of the rim section, it is possible to uniformly enhance, in a circumferential direction, the rigidity of the light alloy wheel which is provided with the reinforced member which is positioned, secured and adhered. As a result, vibration damping performance of the wheel improves and vibration noise performance improves.

Here, it is preferable that positioning be performed by forming the circular reinforced member in a hook section of which the cross-sectional shape in the axial direction along the inner peripheral surface of the other end section of the wheel shows a hook shape and forming a groove section or a step section adapted to engage with a bent end section of the hook section as the engaging section provided along the inner peripheral surface of the other end section side of the rim section in the axial direction.

The circular reinforced member to be attached by the adhesive along the inner peripheral surface of the other end section side of the rim section in the axial direction is formed in a hook section of which the cross-sectional shape in the wheel axis direction shows a hook shape. Therefore, even in the state in which adhesion is removed or adhesion is incomplete (in the process of adhesion), since the circular reinforced member is positioned by the engaging section (the groove section or the step section) of the wheel for its hook shape and contacts (engages with) the inner peripheral surface of the other end section side, it is possible to prevent the reinforced member from dropping off.

It is preferable that the inner peripheral surface be provided with the groove section serving as the engaging section and the width of the groove section in the axial direction be wider than that of the bent end section in the axial direction.

By forming the width of the groove section in the axial direction serving as the engaging section formed on the inner peripheral surface wider than that in the axial direction of the bent end section adapted to engage with the groove section, it is possible to allow a variation of the dimension accuracy of the inner peripheral surface of the rim section of the wheel or a variation of the dimension accuracy of the hook shape of the hook section of the circular reinforced member composed of the reinforced fiber member to some extent and to cause the reinforced member to easily engage with the internal peripheral surface of the rim section of the wheel.

The hook section is composed of the bent end section, a taper-shaped section, and a torso section which is formed substantially in parallel with the bent end section. One end section side of the bent end section may be caused to engage with the groove section or the step section, while the other end section side of the bent end section may continue to a small diameter side of the taper-shaped section and be bent on a large diameter side of the taper-shaped section to continue to the torso section.

In this case, since the hook section is provided with a taper-shaped section, by allowing a variation of the dimension accuracy of the inner peripheral surface of the rim section of the wheel or a variation of the dimension accuracy of a hook shape of the hook section of the circular reinforced member composed of reinforced fiber member to some extent, it is possible to cause the reinforced member to engage more surely with the inner peripheral surface of the rim section of the wheel.

Further, it is preferable that the inner peripheral surface through which the torso section is adhered to the wheel be a cutting surface section.

Since the inner peripheral surface facing the torso section is made a cutting surface section, it is possible to attach the torso section more surely to the inner peripheral surface by an adhesive. It is to be noted that a so-called a wheel balance weight can be firmly attached to the inner peripheral surface by an adhesive.

Still further, it is preferable that the thickness of a layer of the adhesive on a position in which the taper-shaped section is adhered to the inner peripheral surface be thicker than that of a layer of the adhesive on a position in which the torso section is adhered to the cutting surface section of the inner peripheral surface.

In the torso section, a force in the shearing direction is applied to the inner peripheral surface, while, in the taper-shaped section, a force in the peeling direction is applied to the inner peripheral surface. Since the reinforced member becomes easier to come off by the force in the peeling direction than by the force in the shearing direction, by making the thickness of a layer of the adhesive of the inner peripheral surface to which the taper-shaped section is adhered thicker than, that of a layer of the adhesive on the cutting surface section of the inner peripheral surface to which the torso section is adhered and as a result, it is possible to hold the situation hardly causing peeling of the reinforced member.

The reinforced member engageable with the wheel is also included as a single body in the present invention.

Effect of the Invention

According to the present invention, since a circular reinforced member composed of a reinforced fiber member adhered by an adhesive along a circumferential direction to a section of the inner peripheral surface of a rim section on which a tire is mounted is installed, rigidity of a light alloy wheel can foe enhanced. Also, when attaching the reinforced member to the inner peripheral surface of the rim section, the reinforced member can be easily positioned on the inner peripheral surface of the rim section by means of a positioning section.

DETAILED DESCRIPTION OF THE INVENTION

A wheel and its reinforced member according to the present invention will now be described below using preferred embodiments and referring to the accompanying drawings.

[Structure]

Figure 1:
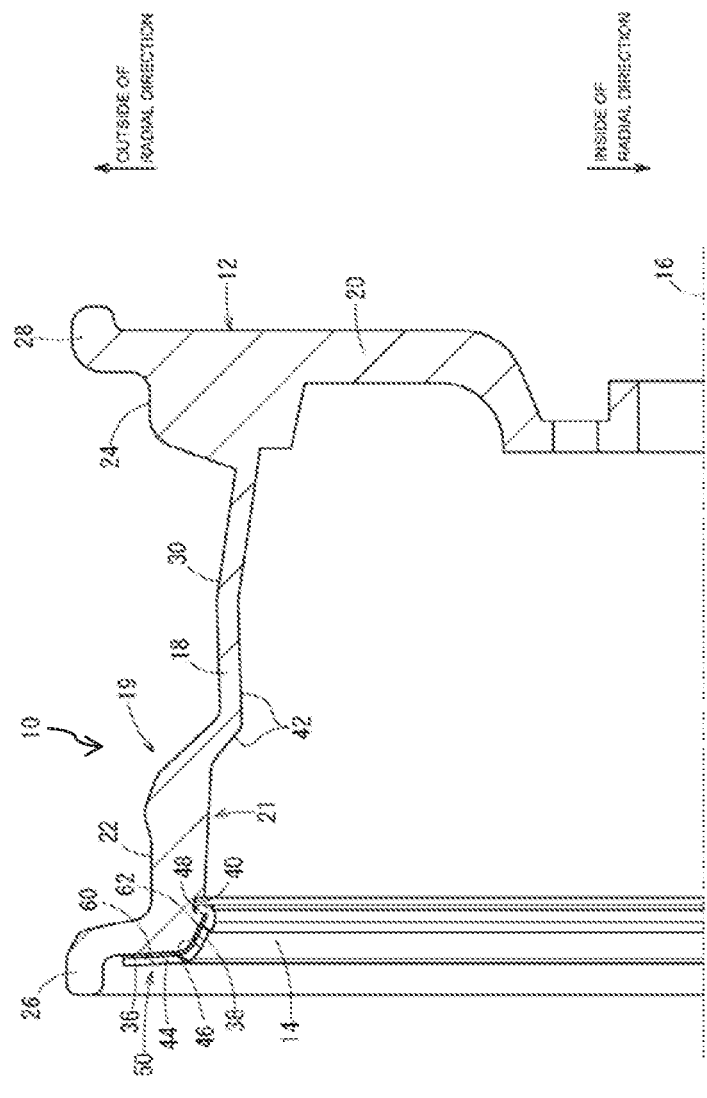
FIG. 1 is a front sectional view of a section above a wheel axis of a wheel according to the present embodiment to which a reinforced member according to the present embodiment is attached.

FIG. 1 is a front sectional view showing a section above a wheel axis 16 (for convenience, also referred to as the center line of a wheel axis 16) of a wheel 10 according to the present embodiment to which a reinforced member 14 according to the present embodiment is attached.

Figure 2:
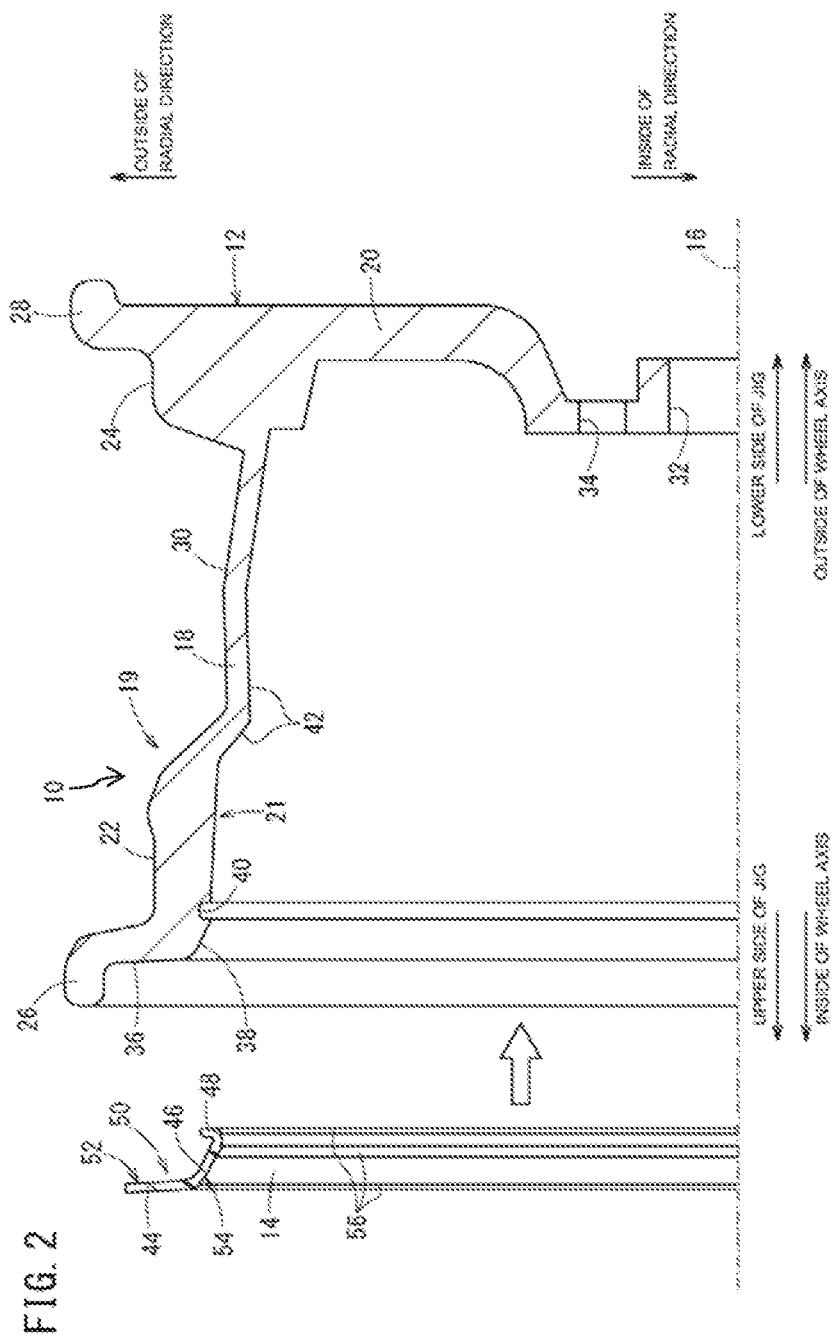
FIG. 2 is a front sectional view showing, side by side, the section above the wheel axis of the wheel according to the present embodiment and the section above the wheel axis before attachment of the reinforced member according to the present embodiment to the wheel.

FIG. 2 is a front sectional view showing, side by side, a section above a wheel axis 16 of a wheel 12 (also referred to as a wheel body 12) according to the present embodiment and a section above a wheel axis 16 before attachment of a reinforced member 14 according to the present embodiment to the wheel 12.

In another words, a reinforced member 14 is attached to a wheel (a wheel body) 12 to make a wheel 10.

The wheel (the wheel body) 12 is made of a light alloy such as an aluminum alloy and a magnesium alloy.

The reinforced member 14 is a reinforced fiber member such as carbon fiber or aramid fiber and made as a molded product by various production methods.

As shown in FIGS. 1 and 2, the wheel (wheel body) 12 is composed of a rim section 18 for mounting a tire thereon (not shown) and a disk section 20 adapted to connect the rim section 18 to a wheel axis hub (not shown).

The wheel 12 according to the present embodiment is made as casting or forging in which the rim section 18 is integrated with the disk section 20, but the present invention can also be applied to a wheel which is made by connecting the rim section 18 to the disk section 20 after they are separately made in casting or forging.

As shown in FIGS. 1 and 2, the rim section 18 is provided, on the outer peripheral surface 19 side, bead seat sections 22, 24 formed on both end sides in the direction of the wheel axis 16, rim flange sections 26, 28 respectively extending in a substantially L shape outside the radial direction of the wheel 12 from the bead seat sections 22, 24, and a well section 30 depressed inside the radial direction of the wheel 12 between the bead seat sections 22, 24.

It is to be noted that the bead seat sections 22, 24 are provided with bead sections of a tire (not shown).

The rim section 18, on the inner peripheral surface 21 side, is composed of a cutting surface section 36 provided at the rim flange section 26 of an end section of the inward direction of the wheel axis, a rim taper-shaped section 38 adapted to allow a large diameter side to communicate with the cutting surface section 36, and a groove section 40 (an engaging section on the rim section side, which is also referred to as a positioning section or a position-determining section) provided to continue, along the circumferential direction, to a small diameter side of the rim taper-shaped section 38, and a brake housing section 42 provided to continue to the groove section 40

Attached to the inner peripheral surface 21 is a so-called balance weight (not shown) in the case of achieving a wheel balance of a tire.

As shown in FIGS. 1 and 2, the circular reinforced member 14 is formed in a hook section 50 of which the cross-sectional shape in the direction, of a wheel axis 16 on the inner peripheral surface 52 side of a side facing the inner peripheral surface 21 of the wheel 13 snows a hook shape and which is provided with a hollow disk-shaped (flange-shaped) torso section 44 extending to the outside of a radial direction, a taper-shaped section 46 of which the large diameter section continues to the inside of the radial direction of the torso section 44 and the small diameter section continues to a base section side of a bent end section 48, and the bent end section 48 (a needle-shaped section, an engaging section on the side of the reinforced member).

The torso section 44 and the bent end section 48 forming the hook section 50 are respectively provided generally perpendicular to the wheel axis 16 and substantially in parallel with each other.

Formed on an cater peripheral surface 54 of the circular reinforced member 14 in the inward direction of the wheel axis is a plurality of circular bulging section 56 adapted to reinforce the reinforced member 14 itself. This bulging section 56, in the production process, has also the advantage that it is easy for hooking and gripping when FA (Factory Automation) devices or the like are used. The bulging section 56 can be set as appropriate.

The disk section 20 is continuously formed from an end section of the outside of the wheel axis of the rim section 18 to the inside of the radial direction of the wheel (wheel body) 12. The disk section 20 is provided at its center with a hub hole 32 through which a wheel axis hub (not shown) penetrates.

A plurality of bolt holes 34 is concentrically formed around the wheel axis 16 relative to the hub hole 32.

[Attachment Steps of a Reinforced Member 14 to a Wheel 12]

Next, attachment steps of a reinforced member 14 to a wheel (a wheel body) 12 having a basic structure stated above will be described hereunder.

Based on the direction as shown in FIG. 2, first, a wheel (wheel body) 12 of which the outside of wheel axis is disposed on the lower side in the vertical direction is horizontally (in a state in which FIG. 2 is turned 90° clockwise) attached and secured to a jig (not shown) which is disposed on a flat floor.

Next, adhesives 60, 62 (see FIG. 1) are respectively applied to each periphery of a cutting surface section 36 and a rim taper-shaped section 38.

To make a thickness of a layer of the adhesives 60, 62 to be applied uniform, it is preferable that the adhesives 60, 62 in which glass beads are mixed be used. The diameter of the glass beads may be the same, but, in the present embodiment, the diameter of the glass bead which is mixed in the adhesive 62 to be applied to the rim taper-shaped section 38 is made larger than that of the glass bead which is mixed in the adhesive 60 to be applied to the cutting surface section 36.

Next, by lowering the reinforced member 14 in the direction of a white arrow as shown in FIG. 2 from the upper side of the jig toward the lower side direction of the jig and pushing it to the inner peripheral surface 21 of a rim section 18, a bent end section 48 of a hook section 50 is dropped into a groove section 40 of the inner peripheral surface 21 of the rim section 18 for engagement (see FIG. 1).

Since the rim taper-shaped, section 38 comes in contact with the taper-shaped section 46 of the hook section 50 immediately before the bent end section 48 is dropped into the groove section 40, the taper-shaped section 46 serves as a structure combined with positioning to automatically allow the reinforced member 14 to align, thereby engaging with the inner peripheral surface 21 of the rim section 18. Accordingly, even though the wheel 12 and its reinforced member 14 turn around the wheel axis 16 to any angle, the uniform thickness of adhesives 60, 62 can be obtained.

As a result, the reinforced member 14 is positioned in the groove section 40 of the wheel 12 for its hook shape to contact and engage with the inner peripheral surface 21 of the rim section 18 to which the adhesives 60, 62 are applied.

More specifically, in a state in which the bent end section 48 of the hook section 50 is fitted into the groove section 40 of the rim section 18 for engagement, the torso section 44 of the hook section 50 is caused to face the cutting surface section 36 through the adhesive 60 and the taper-shaped section 46 of the hook section 50 is caused to face the rim taper-shaped section 38 of the rim section 18 through the adhesive 62, thereby causing the reinforced member 14 to engage with the wheel 12.

Next, in this engaging state, a static load is applied to the reinforced member 14 from the upper side of the jig. The reinforced member is left out at room temperature for a predetermined time or heat is applied, as appropriate, to it for another predetermined time while applying the static load to harden the adhesives 60, 62.

Figure 3:
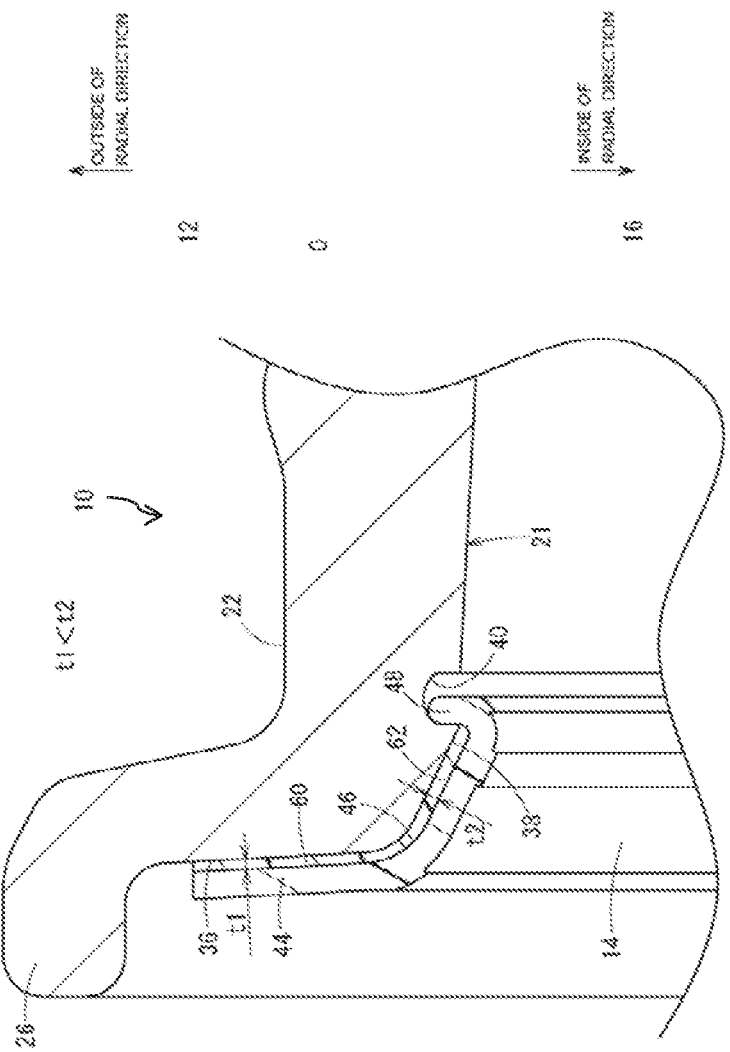
FIG. 3 is a partially notched enlarged front sectional view for explaining the difference in thickness of an adhesive layer.

In this case, as shown in a partially enlarged view of FIG. 3, after hardening the adhesives 60, 62, since the thickness t1, t2 of the adhesives 60, 62 substantially becomes the diameter of glass beads mixed in the adhesives 60, 62, the thickness t2 of the taper-shaped section 46 is thicker than that t1 of the torso section 44 (t2>t1).

In this manner, the circular reinforced member 14 is adhered to the wheel (wheel body) 12 to make the attached wheel 10.

Last, the wheel 10 is removed from the jig (not shown) to mount a tire thereon, and then, a tire with a wheel is installed to a vehicle (not shown).

[Installation of a Tire with a Wheel 10 into a Vehicle]

As well known in general, when the wheel axis hub (not shown) is penetrated into the hub hole 32 of the tire with a wheel 10, a plurality of hub bolts attached to a hub flange section which is formed on the wheel axis hub penetrates through the bolt hole 34. And, by threading a threaded section of the hub bolt projecting to the outside of a wheel axis from the bolt hole 34 in a hub nut (not shown), the tire with the wheel 10 is connected to the wheel axis hub.

SUMMARY OF THE EMBODIMENT AND MODIFICATIONS

A light alloy wheel 10 for a vehicle according to the present embodiment is provided with a rim section 18 which mounts a tire on the outer peripheral surface 19, and a disk section 20 provided on one end section side of the direction of the wheel axis 16 which is the axial direction of the rim section 18.

The wheel 10 is also provided with a groove section 40 serving as an engaging section which is a positioning section provided along the inner peripheral surface 21 of the other end section side of the rim section 18 in the axial direction of a wheel (a wheel body) 12 before the reinforced member 14 is attached, and a circular reinforced fiber 14 composed of a reinforced fiber member which is positioned by allowing a bent end section 48 which is part of the reinforced member 14 to engage with the groove section 40 and is adhered and attached by adhesives 60, 62 to the inner peripheral surface 21 of the other end section side of the rim section 18 in the axial direction.

In the wheel 10 according to the present embodiment, since the circular reinforced member 14 composed of a reinforced fiber member which is positioned by allowing the bent end section 48 (one part) to engage with the groove section 40 (the engaging section) provided along a circumferential direction of the inner peripheral surface 21 of the other end section side of the disk section 20 side of the rim section 18 in the axial direction on which a tire is mounted is adhered and attached by adhesives 60, 62 along the inner peripheral surface 21 of the other end section side (the side where rigidity of the wheel 12 is low) of the disk section 20 side of the rim section 18, the rigidity of the light alloy wheel 10 provided with the positioned, secured and adhered reinforced member 14 can be uniformly enhanced in the circumferential direction. As a result, vibration damping of the wheel 10 improves and the performance of noise vibration improves.

Since the reinforced member 14 is fitted into the inner peripheral surface 21 side of the rim section 18, it has no effect on the bead section of the tire.

In this case, since the reinforced member 14 is formed in a hook section 50 of which the cross sectional shape in the axial direction along the inner peripheral surface 21 of the other end section of the wheel 12 shows a hook shape (a hook structure) and which is provided with a torso section 44, a taper-shaped section 46 which is a bent section, and a bent end section 48 (a needle-shaped section) and a groove section 40 adapted to engage with the bent end section 48 (a needle-shaped section at the tip section) of the hook section 50 is formed, as the engaging section provided along the inner peripheral surface 21 of the other end section side of the rim section 18 in the axial direction. With this arrangement, positioning of the reinforced member is performed.

Since the reinforced member 14 to be attached by adhesives 60, 62 along the inner peripheral surface 21 of the other end section side of the rim section 18 in the axial direction is formed in the hook section 50 of which the cross-sectional shape in the wheel axis 16 direction (the axial direction of the wheel 12) shows the hook shape, even in the state in which adhesion is removed or adhesion is incomplete, the reinforced member is positioned by the groove section 40 of the engaging section of the wheel 12 for the hook shape (hook structure) and comes in contact (engage with) the inner peripheral surface 21 of the other end section side, it is possible to prevent fall of the reinforced member.

Figure 4:
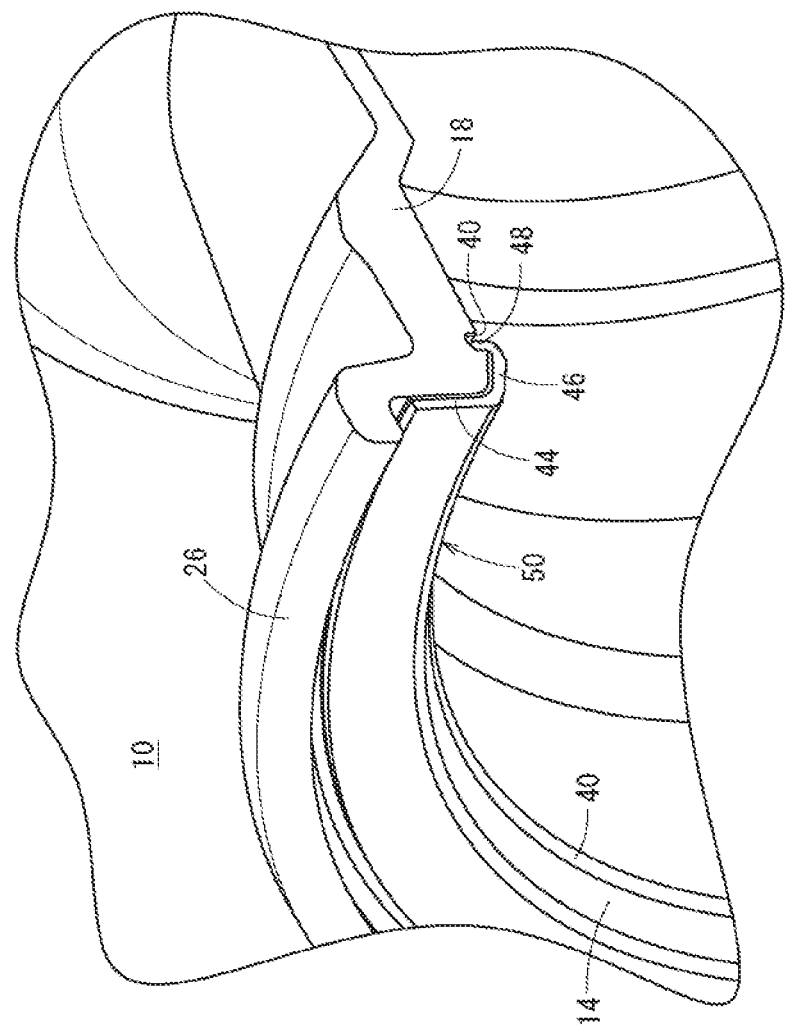
FIG. 4 is a perspective partial sectional view showing an engaging condition of the reinforced member with the wheel.

In other words, as shown in FIG. 4, since the inner circumferential surface side of the rim flange section 26 can be gripped by an elastic force of the hook section 50 of the reinforced member 14, it can be said that it is made to prevent fail of the reinforced member. Accordingly, even in a state in which adhesion is incomplete, since the reinforced member is integrated with the wheel 12, it is possible to feed the reinforced member onto, for example, an existing coating line of the wheel 10 to perform coating.

Figure 5:
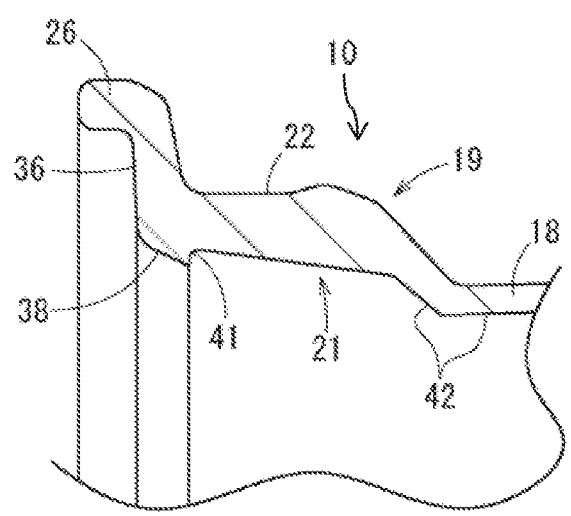
FIG. 5 is a partially notched front sectional view showing a modification of an engaging section provided on the inner peripheral surface of a rim section.

Further, as shown in FIG. 5, the groove section 40 may be a step section 41 (Modification 1).

In the case of the groove section 40, as shown in FIG. 1, it is preferable that the width of the groove section 40 in the axial direction be made wider than that of the bent end section 48 (needle-shaped section) in the axial direction. By allowing a variation of the dimension accuracy of the inner peripheral surface 21 of the rim section 18 of the wheel 12 or a variation of the dimension accuracy of the hook shape of the hook section 50 of the circular reinforced member 14 composed of the reinforced fiber member to some extent, it is possible to allow the reinforced member 14 to easily engage with the inner peripheral surface 21 of the rim section 18 of the wheel 12.

Further, the groove section 40 is now formed on the wheel (wheel body) 12 by casting, but not only this, it may be formed by a so-called later additional processing in which, for example, a semicircular processing is performed by using, for example, an end mill with a smallest diameter of R5. For example, if we assume that the wheel size is about 17~21 inches, in the case where the groove width after processing by the end mill is minimum 5 [mm], thickness of the reinforced member 14 is increased in proportion to the wheel size to have about 2~3.5 [mm], and allowance in the case where the bent end section 48 of the reinforced member 14 engages with the groove section 40 is about 1.5~3 [mm] in width (width of one side 0.75~1.5 [mm]). By changing the thickness of the reinforced member 14, even in the same wheel (wheel body) 12, the rigidity and the performance of vibration noise can be changed.

Here, the hook section 50 of the reinforced member 14 is composed of a bent end section 48, a taper-shaped section 46, and a torso section 44 which is substantially in parallel with the bent end section 48, wherein the bent end section 48 is formed in such a manner that one end section side (the pointed end side) engages with the groove section 40 or the step section and the other end section side (root side) continues to the small diameter side of the taper-shaped section 46 and is bent on the large diameter side of the taper-shaped section 46 to continue to the torso section 44.

In this manner, since the hook section 50 is provided with the taper-shaped section 46, by allowing a variation of the dimension accuracy of the inner peripheral surface 21 of the rim section 18 of the wheel 12 or a variation of the dimension accuracy of the nock shape of the hook section 50 of the circular reinforced member 14 composed of reinforced fiber member to some extent, it is possible to allow the reinforced member 14 to engage with the inner peripheral surface 21 of the rim section 18 of the wheel 12 more surely.

Further, since the inner peripheral surface 21 of the wheel 12 to which the torso section 44 of the hook section 50 is attached is formed to have the cutting surface 36, it is possible to allow the torso section 44 to adhere to the inner peripheral surface 21 by adhesive more surely. It is to be noted that weights for wheel balance can be closely attached to the inner peripheral surface 21 by adhesive.

In this case, the thickness t2 of a layer of the adhesive 62 on the position in which the taper-shaped section 46 is attached to the inner peripheral surface 21 of the rim flange section 26 is made thicker than that t1 of a layer of the adhesive 60 on a position in which the torso section 44 is adhered to the cutting surface section 36 of the inner peripheral surface 21. In this case, in the torso section 44, a force in the shearing direction (a radial direction of FIG. 2) is applied to the inner peripheral surface 21, while, in the taper-shaped section 46, a force in the peeling direction is applied to the inner peripheral surface 21. Since the reinforced member 14 becomes easier to come off by the force in the peeling direction than by that in the shearing direction, the thickness 12 of a layer of the adhesive 62 of the inner peripheral surface 21 to which the taper-shaped section 46 is attached is made thicker than thickness t1 of a layer of the adhesive 60 on the cutting surface section 36 of the inner peripheral surface 21 to which the torso section 44 is attached. With this, it is possible to hold the situation hardly causing peeling of the reinforced member 14.

The reinforced member 14 engageable with the wheel 12 can also be included in the present invention as a single body.

Further, the present invention is not limited to the embodiments stated above and can be modified based on the description of the specification.

The wheel 10 provided with the reinforced member 14 increases in cost as compared, to that with no reinforced member 14, but, from a viewpoint of the improved rigidity of the wheel 10, by installing the wheel 10 provided with the reinforced member 14 only to the right and left front wheels which are steering wheels for, for example, a four-wheeled vehicle, it has been confirmed in the actual vehicle driving that the tire rigidity increases especially at the time of low speed steering (torsion of the tire decreases) and as a result, a smart steering feeling can be obtained.

DESCRIPTION OF REFERENCE NUMERALS

10: wheel; 12; wheel (wheel body); 14: reinforced member; 16: wheel axis; 18: rim section; 19: outer peripheral surface; 21: inner peripheral surface; 36: cutting surface section; 40: groove section; 41: step section; 44: torso section; 46: taper-shaped section; 48: bent end section; 50: hook section; 60, 62: adhesive

The invention claimed is:

1. A light alloy wheel for a vehicle, comprising:
a rim having a disk section, an inner peripheral surface, and an outer peripheral surface on which a tire is mounted, the disk section being provided at one axial end side in an axial direction of the rim; and
a circular reinforced member composed of a reinforced fiber member and configured to be fitted and adhered to a part of the inner peripheral surface of the rim along a circumferential direction of the rim, wherein
the rim has a position-determining section formed on the inner peripheral surface of the rim and configured to determine a position of the reinforced member,
the position-determining section is an engaging section formed along the inner peripheral surface on the other axial end side of the rim in the axial direction, and
the circular reinforced member is positioned by engaging in part with the engaging section and is adhered and attached by an adhesive to the inner peripheral surface of the other axial end side of the rim in the axial direction,
the circular reinforced member has a hook shape in a cross section of the member along a plane along the axial direction, the hook shape having a bent end section abutting the inner peripheral surface of the other axial end side of the rim, and
the engaging section is a groove section or a step section formed on the inner peripheral surface of the rim so as to engage with the bent end section of the hook shape, thereby to place and maintain the circular reinforced member in a predetermined position along the inner peripheral surface of the rim.

2. The wheel according to claim 1, wherein
the engaging section is the groove section having a width in the axial direction which is wider than a width of the bent end section in the axial direction.

3. The wheel according to claim 1, wherein
the hook shape is composed of the bent end section, a taper-shaped section, and a torso section which is substantially in parallel with the bent end section, and
in the hook shape, one axial end side of the bent end section engages with the groove section or the step section formed on the inner peripheral surface of the rim, the other axial end side of the bent end section being bent to connect with a small diameter side of the taper-shaped section, a large diameter side of the taper-shaped section being bent to connect with the torso section.

4. The wheel according to claim 3, wherein
a part of the inner peripheral surface of the rim to which the torso section of the hook shape is adhered is a cutting surface section.

5. The wheel according to claim 4, wherein
a thickness of a layer of the adhesive between the taper-shaped section of the hook shape and the inner peripheral surface of the rim is larger than a thickness of a layer of the adhesive between the torso section and the cutting surface section of the inner peripheral surface of the rim.

6. The circular reinforced member which is engageable with the wheel according to claim 1.

* * * * *